July 16, 1957　　　M. J. KELLY　　　2,799,469
LATERAL OUTLET FITTINGS FOR ABOVE-GROUND IRRIGATION PIPES
Filed May 27, 1954
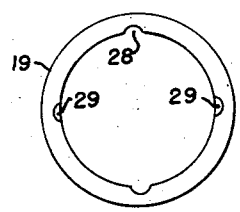
Fig. 1
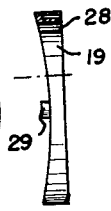
Fig. 2
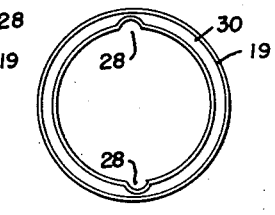
Fig. 3
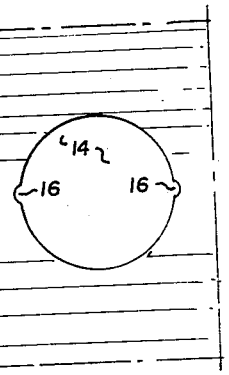
Fig. 4
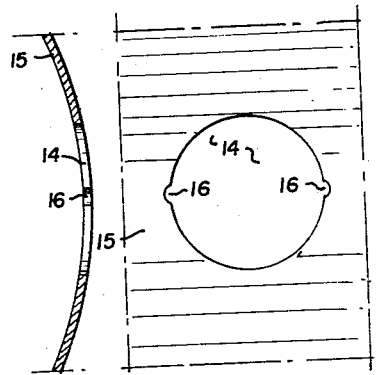
Fig. 5
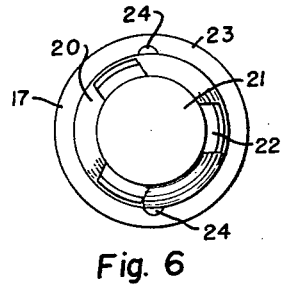
Fig. 6
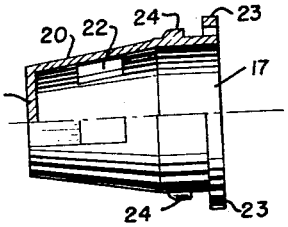
Fig. 7
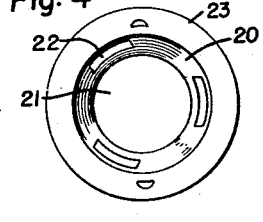
Fig. 8
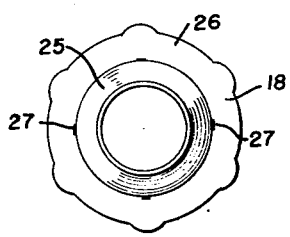
Fig. 9
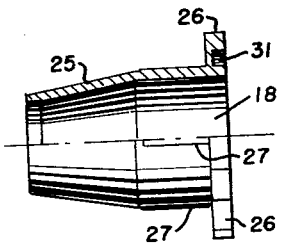
Fig. 10
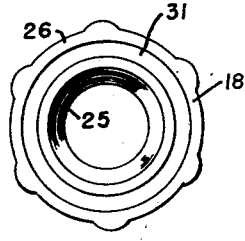
Fig. 11
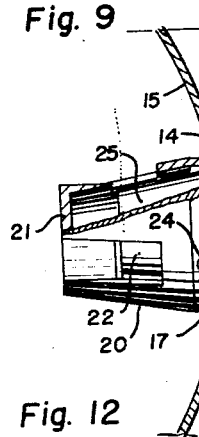
Fig. 12
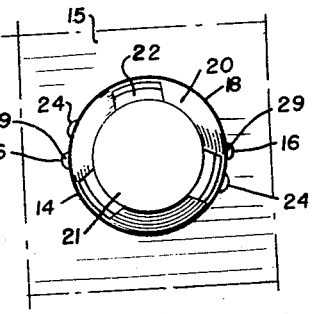
Fig. 13
INVENTOR.
Martin J. Kelly
BY
ATTORNEY

United States Patent Office 2,799,469
Patented July 16, 1957

2,799,469

LATERAL OUTLET FITTINGS FOR ABOVE-GROUND IRRIGATION PIPES

Martin J. Kelly, Grand Island, Nebr.

Application May 27, 1954, Serial No. 432,800

2 Claims. (Cl. 251—145)

Above-ground, thin-walled pipes are being rapidly adopted for modern irrigation systems and plastic pipes are being increasingly used for this purpose.

It is necessary to provide a plurality of lateral outlets at spaced intervals along the pipe for distributing the water from the pipe to the plant rows and these lateral outlets must be accurately controllable to obtain a proper distribution of the water throughout the entire length of the pipe. Ordinary threaded valves and fittings are impractical for this purpose due to the difficulty of making an attachment to the thin wall of the pipe and to the great weight and expense involved in view of the exceedingly large number of outlets required along each pipe length.

The principal object of this invention is to provide a lateral outlet fitting for above-ground irrigation pipes which will be exceedingly economical to manufacture; which can be securely attached to the pipe outlet by a simple twisting movement; which will provide accurate control of the discharging water; and which will be leak-proof when closed.

Another object of the invention is to provide a construction for a side outlet fitting which can be economically and efficiently molded from a polystyrene plastic or similar material so as to avoid rust and corrosion.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is an inside face view of a sealing ring employed in the improved lateral outlet fitting for above-ground irrigation pipes;

Fig. 2 is a side view thereof partially in section;

Fig. 3 is an outside face view of the sealing ring of Fig. 1;

Fig. 4 is a fragmentary section through a side outlet opening in the wall of an irrigation pipe;

Fig. 5 is a fragmentary side view of the irrigation pipe of Fig. 4 illustrating the type of side outlet opening employed for receiving the improved fitting;

Fig. 6 is an inner end view of a valve housing employed in the improved fitting;

Fig. 7 is a side view of the valve housing illustrating the latter partially in section;

Fig. 8 is an outside end view of the valve housing;

Fig. 9 is an inside end view of a valve plug employed for receiving the improved fitting;

Fig. 10 is a side view of the valve plug, illustrating it partially in section;

Fig. 11 is an outside end view of the valve plug of Figs. 9 and 10;

Fig. 12 is a side view of the improved assembled fitting partially in section, illustrating it in place in the side wall of an irrigation pipe; and Fig. 13 is an outside face view of the valve housing in place in the pipe.

The improved fitting comprises a cup-like valve housing 17, a hollow, tubular valve plug 18, and a sealing washer 19. The above elements are molded from polystyrene plastic or any other suitable non-corrosive moldable material and are designed to be fitted into an opening 14 in the side wall of an above-ground irrigation pipe, such as indicated at 15 on the drawing. The opening 14 is round and provided with two diametrically opposed peripheral notches 16.

The valve housing 17 is illustrated in detail in Figs. 6, 7 and 8. It has a cup-like shape with a cylindrical outlet portion joined to a tapered valve seat portion 20 having a closed inner extremity 21. A plurality of outlet ports 22, preferably three, are formed in the tapered wall of the valve seat portion 20. The outer extremity of the valve housing 17 is formed with an annular peripheral flange 23. Two diametrically opposed lugs 24 project from the cylindrical portion of the valve housing 17 in spaced relation to the flange 23.

The valve plug 18 comprises a cylindrical outer portion joined to a tubular tapered inner portion 25, the taper of which substantially corresponds to the inner taper of the tapered seat portion 20 of the housing 17. A terminal flange 26 surrounds the discharge or outer extremity of the plug 18, and a plurality of longitudinally extending, spaced-apart friction ridges 27, preferably four, are formed on the cylindrical portion of the plug. The diameter of the plug, exteriorly of the ridges 27 is very slightly in excess of the inner diameter of the housing 17.

The sealing washer 19 comprises an annular member of a diameter to slip over the valve housing 17 and provided with two diametrically opposed, internal grooves 28 designed to slip over the lugs 24 and with two diametrically opposed bosses 29 designed to fit into the notches 16 of the pipe opening 14. The lugs 29 are positioned intermediate the grooves 28 and project from the inner face of the washer. The entire inner face of the washer is curvated or concave upon a cylindrical curvature corresponding to the external curvature of the pipe 15. The washer 19 is preferably formed with an annular groove 30, and the flange 26 of the valve plug 18 is provided with a similar annular groove 31, to reduce the amount of plastic material required and to obtain a relatively thin, uniform cross-section so as to reduce warpage.

Before installing the improved fitting, the washer is slipped over the valve housing and the flat side of the washer is brought into engagement with the flange 23 of the housing by passing the grooves 28 over the lugs 24. The housing is then passed into the opening 14 by passing the lugs 24 through the notches 16. When finally in place, the lugs 24 pass within the wall of the pipe 15 and the bosses 29 rest within the notches 16. Thus, it can be seen that the housing 17 can be rotated but the washer 19 will be prevented from rotation by the notches 16.

Rotation of the housing causes the lugs 24 to move into engagement with the curved inner surface of the pipe, as shown in Fig. 12, so as to wedge tightly thereagainst, to cause the flange 23 on the housing to compress the washer 19 against the external surface of the pipe, thus firmly locking the fitting in sealed relation with the pipe wall.

The permanency of the seal can be increased by placing a layer of plastic cement 32 around the opening 14 so that the curvated surface of the washer will be pressed into the cement to become permanently attached to the pipe. It can be seen that with the housing in position in the pipe, water can flow from the pipe through the ports 22 into the hollow interior of the housing 17 and discharge from the open outer extremity of the latter.

The flow of water through the housing can be controlled by forcing the valve plug 18 into the housing until the friction ridges 27 frictionally engage the internal wall of the housing. The water is now forced to flow around the open inner extremity of the plug 18 and through the latter. The amount of flow is controlled by forcing the plug inwardly into and outwardly from the housing. If the plug be forced completely into the housing, its open bottom will be sealed against the closed inner extremity 21 of the housing, and its tapered inner portion 25 will completely close the outlet ports 22. The flange 26 is provided with six protruding finger grips as illustrated to facilitate turning the plug for adjustment purposes.

The invention is adaptable to metallic or plastic pipes and is more particularly applicable to thin walled pipe of the above-ground irrigation type. However, heavier walled pipes could also employ the invention by providing fittings in which the distance between the flange 23 and the lugs 24 was such as to allow the lugs to turn against the inside wall of the pipe.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. A side outlet fitting formed of non-corrosive plastic material adapted for insertion into a side opening of an above ground irrigation pipe, said fitting comprising a cup-shaped valve housing having a bottom portion, an outwardly tapering frusto conical side portion terminating in a cylindrical portion extending from said frusto conical portion and a substantially annular flange surmounting said cylindrical portion, lugs projecting outwardly from said cylindrical portion spaced about the periphery of said cylindrical portion and disposed in a plane parallel to said flange, said lugs being adapted to be inserted through correspondingly spaced notches in the edge of a circular opening in an irrigation pipe into which said housing is inserted to be locked thereto by a rotary movement of the housing; and a valve member comprising a shell open at both ends composed of a cylindrical portion having an outer surface adapted to fit closely the interior cylindrical surface of said housing, and a frusto conical extension of said cylindrical portion of a form closely fitting the interior surface of said frusto conical portion of said housing, there being a plurality of longitudinal ridges spaced about the periphery of said cylindrical portion of said valve member adapted for frictional engagement with the interior cylindrical surface of said housing; said frusto conical portion of said housing being formed with peripherally spaced ports, whereby inner and outer movements of said valve member serve to adjust the effective exit area of the passage between the adjacent frusto conical surfaces to thereby adjust the rate of flow of water through said ports toward the inner mouth of said valve.

2. A side outlet fitting as defined in claim 1, wherein a flexible washer is adapted to be disposed between said annular flange of said housing and said irrigation pipe for forming a tight leak proof fit therebetween, said washer being formed with a plane surface on one side thereof for engagement with said flange and cylindrical surface on the other side thereof adapted for fitting engagement with the cylindrical surface of the irrigation pipe, and lugs projecting from said cylindrical surface adapted for locking engagement with said spaced notches in said edge of said circular opening in the irrigation pipe.

References Cited in the file of this patent
UNITED STATES PATENTS

| | | |
|---|---|---|
| 889,952 | McGinley | June 9, 1908 |
| 2,035,953 | Fernholz | Mar. 31, 1936 |
| 2,095,622 | Wilson | Oct. 12, 1937 |
| 2,498,222 | Roberts | Feb. 21, 1950 |
| 2,693,203 | Hempel | Nov. 2, 1954 |

FOREIGN PATENTS

| | | |
|---|---|---|
| 15,004 | Austria | Feb. 10, 1904 |
| 302,630 | Italy | of 1932 |